(12) United States Patent
Mishra et al.

(10) Patent No.: US 10,460,465 B2
(45) Date of Patent: Oct. 29, 2019

(54) METHOD FOR GENERATING ROOF OUTLINES FROM LATERAL IMAGES

(71) Applicant: Hover Inc., San Francisco, CA (US)

(72) Inventors: Ajay Mishra, Palo Alto, CA (US); William Castillo, San Carlos, CA (US); A. J. Altman, San Francisco, CA (US); Manish Upendran, San Francisco, CA (US)

(73) Assignee: Hover Inc., San Francisco, CA (US)

( * ) Notice: Subject to any disclaimer, the term of this patent is extended or adjusted under 35 U.S.C. 154(b) by 0 days.

(21) Appl. No.: 15/693,347

(22) Filed: Aug. 31, 2017

(65) Prior Publication Data

US 2019/0066322 A1    Feb. 28, 2019

(51) Int. Cl.
| | | |
|---|---|---|
| *G06K 9/00* | (2006.01) | |
| *G06T 7/62* | (2017.01) | |
| *G06T 7/00* | (2017.01) | |
| *G06K 9/46* | (2006.01) | |
| *G06T 17/20* | (2006.01) | |
| *G06T 17/00* | (2006.01) | |

(52) U.S. Cl.
CPC .............. *G06T 7/62* (2017.01); *G06K 9/4638* (2013.01); *G06T 7/97* (2017.01); *G06T 17/00* (2013.01); *G06T 17/20* (2013.01); *G06T 2207/20221* (2013.01); *G06T 2207/30184* (2013.01)

(58) Field of Classification Search
None
See application file for complete search history.

(56) References Cited

U.S. PATENT DOCUMENTS

| | | | | |
|---|---|---|---|---|
| 8,558,848 | B2* | 10/2013 | Meadow | G06T 17/05 |
| | | | | 345/632 |
| 8,610,708 | B2* | 12/2013 | Richards | G06T 7/536 |
| | | | | 345/419 |
| 9,098,870 | B2* | 8/2015 | Meadow | G06K 9/32 |
| 9,317,966 | B1* | 4/2016 | Deephanphongs | G06T 17/00 |
| 9,437,033 | B2* | 9/2016 | Sun | G06K 9/00214 |
| 2010/0118116 | A1* | 5/2010 | Tomasz | G01C 11/02 |
| | | | | 348/36 |
| 2013/0155109 | A1* | 6/2013 | Schultz | G06T 11/003 |
| | | | | 345/634 |
| 2014/0125671 | A1* | 5/2014 | Vorobyov | G01C 11/00 |
| | | | | 345/427 |
| 2015/0213590 | A1* | 7/2015 | Brown | G06T 17/05 |
| | | | | 345/419 |

(Continued)

OTHER PUBLICATIONS

Hegarty et al., "SAMATS—triangle grouping and structure recovery for 3D building modeling and visualization", W2GIS 2005, LNCS 3833, pp. 267-280, 2005 (Year: 2005).*

(Continued)

*Primary Examiner* — Soo Jin Park
(74) *Attorney, Agent, or Firm* — Hickman Palermo Becker Bingham LLP

(57) ABSTRACT

A computer system generates an outline of a roof of a structure based on a set of lateral images depicting the structure. For each image in the set of lateral images, one or more rooflines corresponding to the roof of the structure are determined. The computer system determines how the rooflines connect to one another. Based on the determination, the rooflines are connected to generate an outline of the roof.

24 Claims, 7 Drawing Sheets

(56) References Cited

U.S. PATENT DOCUMENTS

2016/0239976 A1* 8/2016 Fathi ...................... G06T 7/579

OTHER PUBLICATIONS

Wirtz et al., "Semiautomatic generation of semantic building models from image series", Proc. SPIE 8290, ThreeDimensional Image Processing (3DIP) and Applications II, 829019 (Jan. 30, 2012) (Year: 2012).*

* cited by examiner

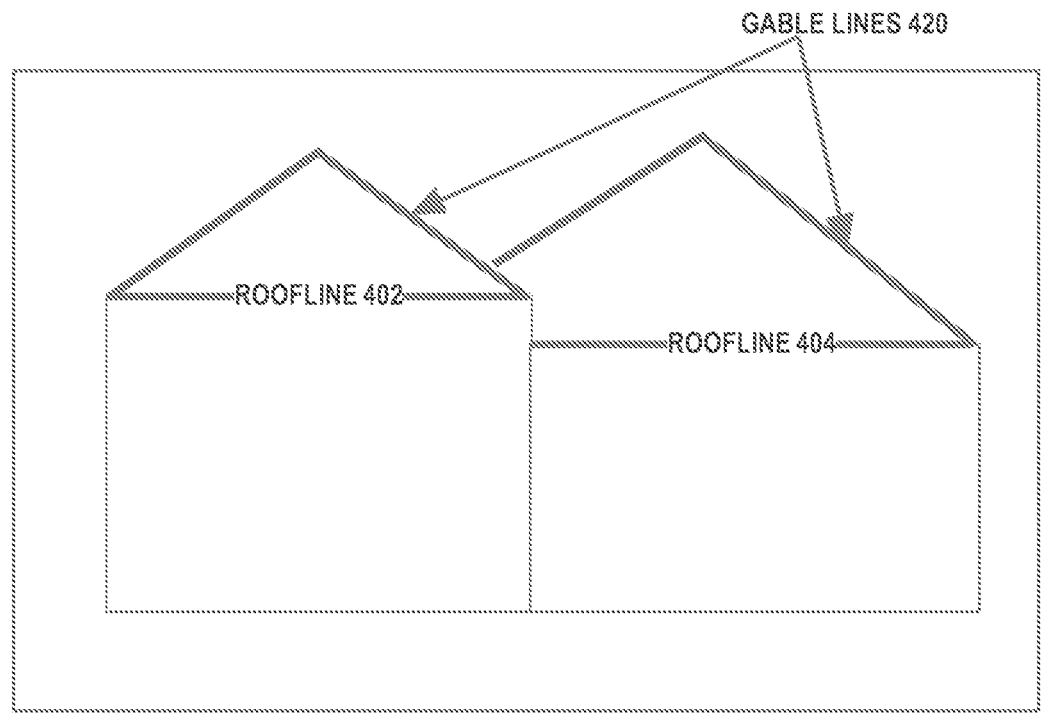
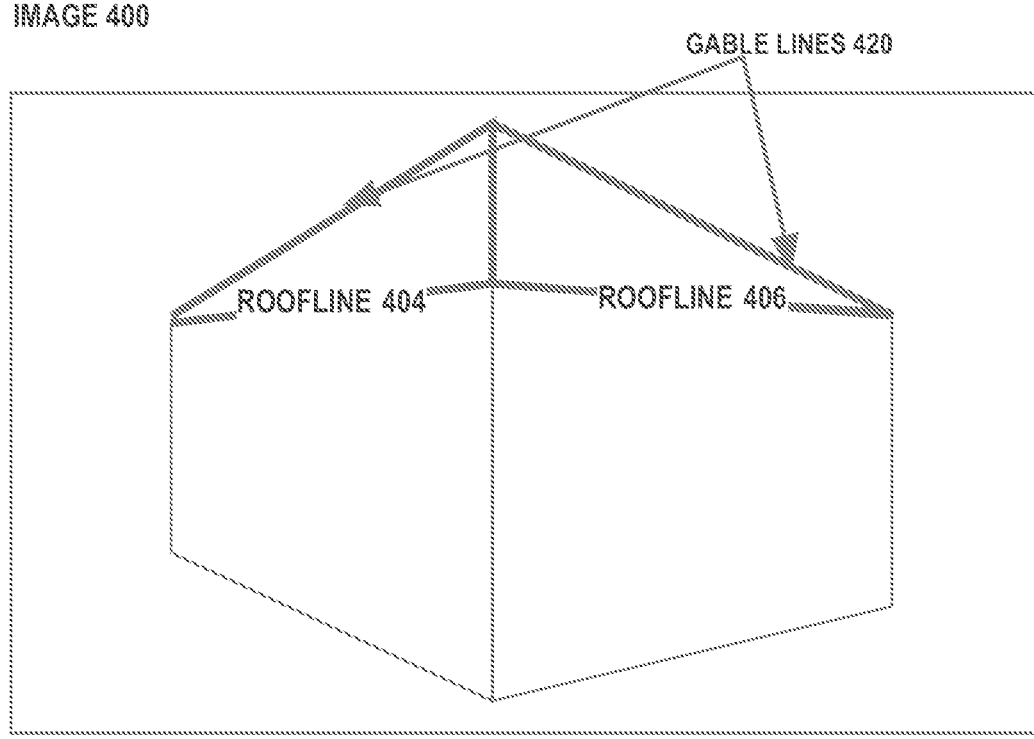
FIG. 4

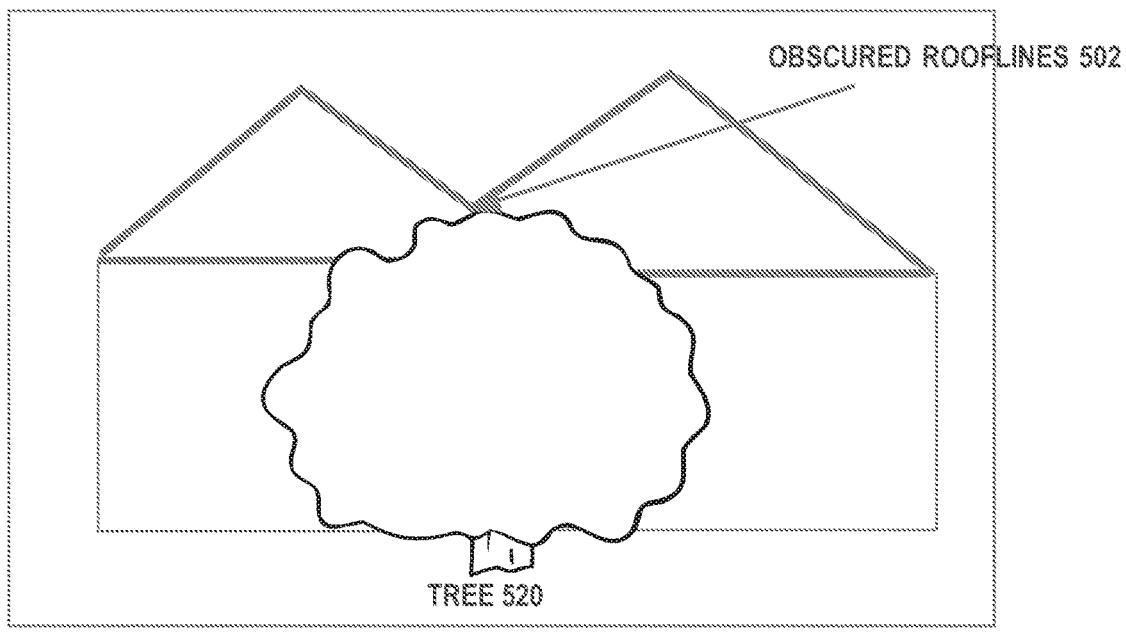
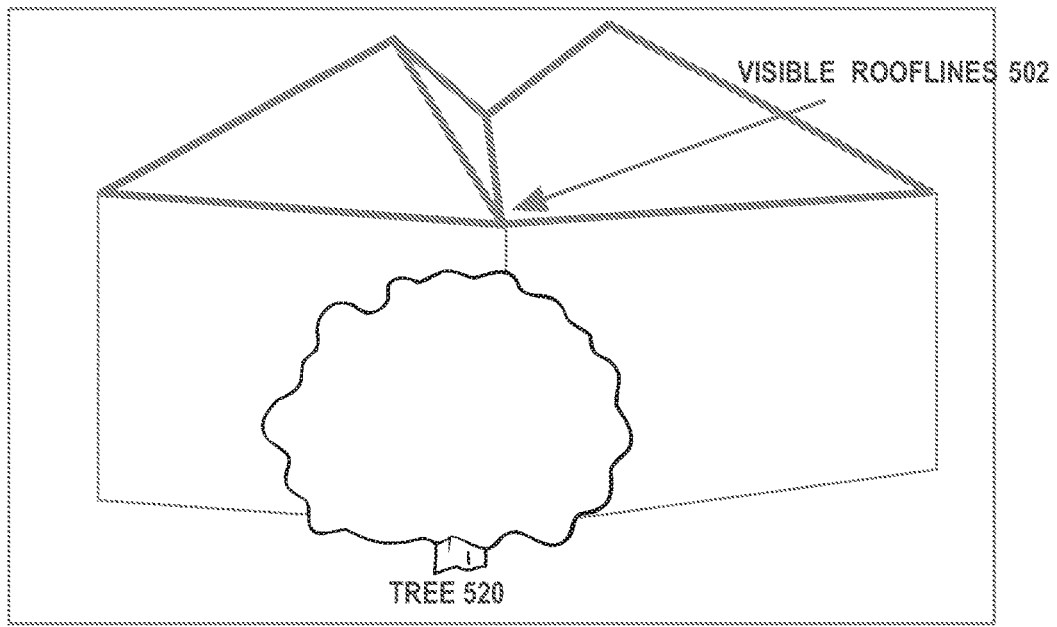
FIG. 5

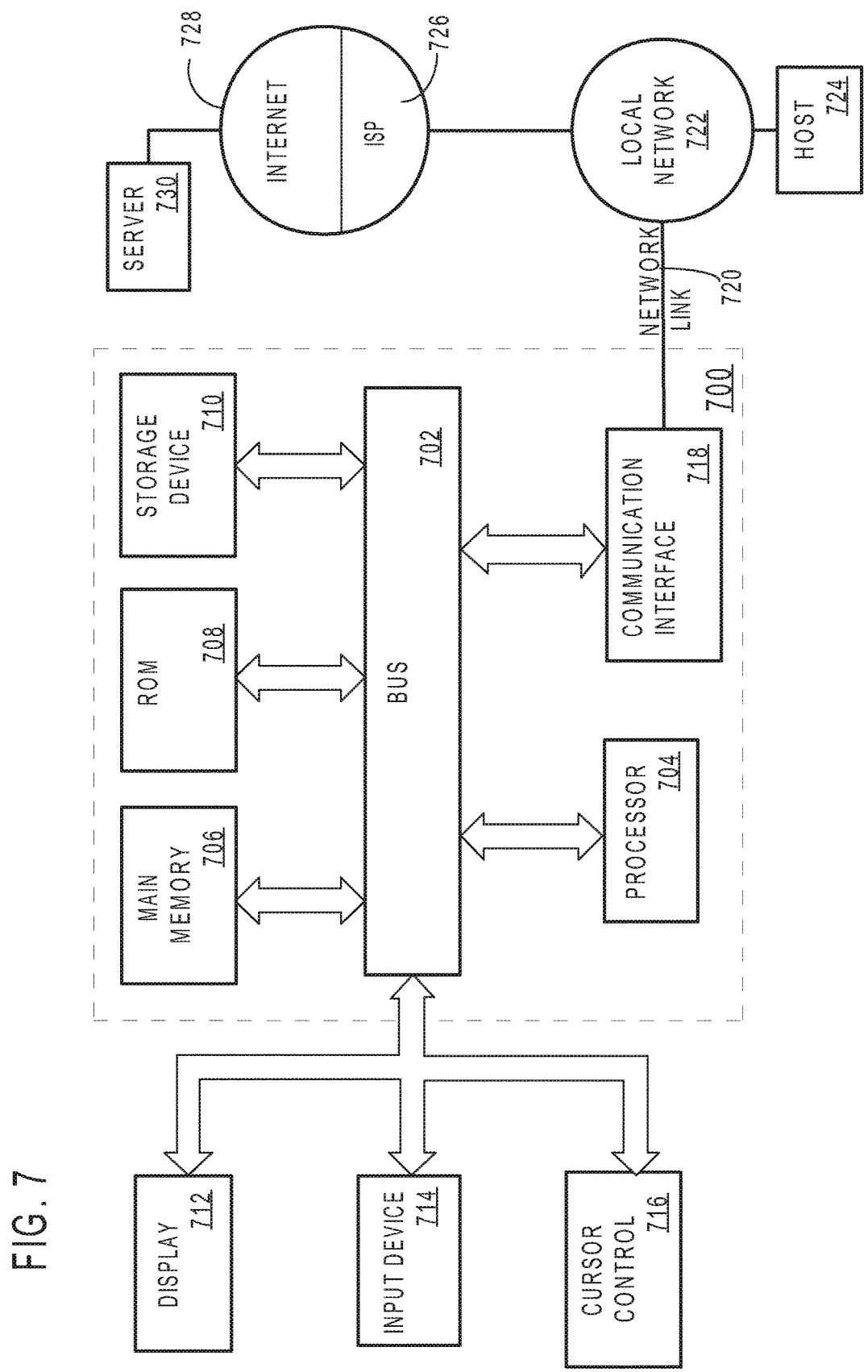

METHOD FOR GENERATING ROOF OUTLINES FROM LATERAL IMAGES

FIELD OF THE INVENTION

The present invention relates to digital image processing and more specifically, to generating an outline of a roof based on lateral images.

BACKGROUND

Three-dimensional (3D) models of a building may be generated based on two-dimensional (2D) digital images taken of the building. The digital images may be taken via aerial imagery, specialized-camera equipped vehicles, or by a user with a camera. The 3D building model is a digital representation of the physical, real-world building. An accurate 3D model may be used to derive various building measurements or to estimate design and renovation costs.

However, generating a 3D model of a building requires significant time and resources. If only a particular measurement, or set of measurements, is needed, it would be inefficient to generate a 3D model of the whole building in order to derive the particular measurement or measurements.

Rather than generating a 3D model to derive a measurement, the measurement may be estimated using a machine learning model. For example, the roof area of a building may be estimated based on the roof outline of the building. An outline of the roof of the building may be generated using one or more images that depict an overhead view of the building, such as orthographic or oblique images.

However, overhead images must be captured using specialized equipment or licensed from a $3^{rd}$-party provider. Thus, overhead images may be difficult or costly to obtain. Additionally, the overhead view of a building may not fully describe features such as roof overhangs, wall to roof features, and etc. Furthermore, overhead imagery might be obstructed by foliate, cloud cover, neighboring buildings, and etc. Thus, a method for generating an outline of a building using only ground level images, or images taken at different heights and angles, is desired. Images taken at different heights may include, for example, images from a hand-held camera from a person standing on a roof or images from a remotely-operated camera capable of taking images at different heights.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4 illustrates an example set of lateral images;

FIG. 5 illustrates an example set of lateral images;

FIG. 7 is a block diagram illustrating a computer system that may be used to implement the techniques described herein.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for generating an outline of a top of a structure based on a set of lateral images. As used herein, the term "structure" refers to any 3-dimensional object whose top-down outline may be generated based on lateral images depicting the structure. A structure may be man-made or natural. Structures may include, for example, houses, offices and other buildings, walls, statutes, and etc. An outline is the shape the top of the structure would have if viewed from a top-down view.

As referred to herein, a "lateral photo" or a "lateral image" is a digital image that substantially depicts one or more sides of a single building. A lateral photo may be captured at or near ground level. Additionally, a lateral photo may be captured at higher levels using, for example an image capture device mounted on a stick or on a drone.

For the purpose of explanation, examples shall be given herein where the outline is a roof outline for a building. However, the techniques described herein are not limited to any particular type of structure.

In an embodiment, a set of rooflines depicted in a set of lateral images are determined. Determining the set of rooflines comprises, for each image, determining at least one roofline corresponding to the roof of the building depicted in the image. The set of rooflines are connected to generate the roof outline.

In an embodiment, to determine how to connect rooflines in the set of rooflines, the relative position of each image is determined. Determining the relative position of each image comprises determining a relative location and a relative rotation. In an embodiment, the relative position is determined based on sensor data associated with each image. As an example, azimuth data providing camera orientation relative to magnetic north may be combined with GPS location to calculate the camera position for the image. As another example, the relative altitude of a camera in combination with the gravity vector may be used to calculate the tilt of the camera for an image. In an embodiment, the relative position is determined based on common structure features depicted in each image.

System Overview

Figure 1:
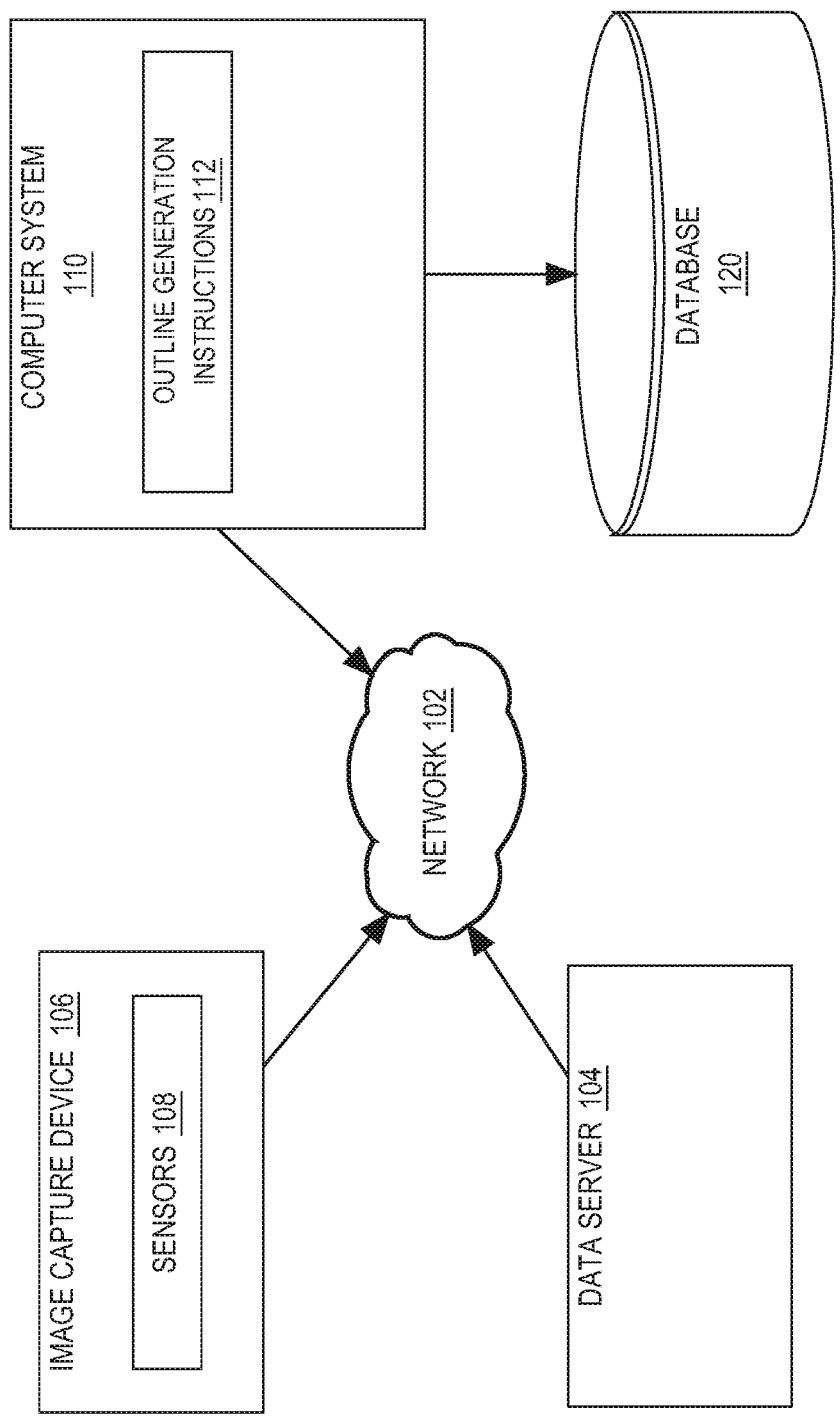
FIG. 1 illustrates an example computer system configured to perform the functions described herein.

FIG. 1 illustrates an example computer system 110 that is configured to perform the techniques described herein. In the illustrated embodiment, computer system 110 is communicatively coupled via a network 102 to a data server 104 and an image capture device 106. Example computer system 110 may include, or communicate with, other devices including computing devices, image capture devices, databases and other data storage devices, and display devices, according to embodiments. For example, a plurality of image capture devices and data servers may be communicatively coupled to computer system 110. As another example, one or more of the services attributed to computer system 110 herein may be run on other computer systems that are communicatively coupled to network 102.

Computer system 110 may be implemented by any type of computing device that is communicatively coupled to network 102. Example implementations of computer system 110 include, but are not limited to, workstations, personal computers, laptops, multi-processor systems, and the like. Although FIG. 1 shows a single element, computer system 110 may comprise one or more computers, such as a server cluster, and the computer system 110 may be located in one or more physical locations.

In the illustrated embodiment, computer system 110 is communicatively coupled to a database 120, which stores images received at computer system 110. Database 120 may also store metadata associated with each image. In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. Database 120 may be internal or external to computer system 110.

In some embodiments, computer system 110 may download, obtain, or receive digital images from various sources, such as data server 104 or image capture device 106. Example sources include image capture devices, remote computing devices, such as mobile phones or server computers.

Data server 104 may be any computing device, including but not limited to: servers, racks, work stations, personal computers, laptops, Internet appliances, wireless devices, wired devices, multi-processor systems, and the like. Although FIG. 1 shows a single element, the data server 104 broadly represents one or more multiple server computers, such as a server cluster, and data server 104 may be located in one or more physical locations. Data server 104 may also represent one or more virtual computing instances that execute using one or more computers in a datacenter such as a virtual server farm. Data server 104 may receive or obtain digital images from an image capture device 106, users, other data servers, or other sources. Data server 104 may also transmit digital images to computer system 110.

Image capture device 106 may be any device that can capture or record images and videos. For example, image capture device 106 may be any computing device with a built-in camera or a communicatively coupled digital camera. Example image capture devices include mobile phones, tablets, a computer with a webcam, a drone, or a specialized camera-equipped vehicle. In the illustrated embodiment, image capture device 106 includes one or more sensors 108. Sensor data from sensors 108 may be stored in association with digital images captured by image capture device 106. Example sensors include, but are not limited to, global positioning system (GPS), accelerometers, altimeters, gyroscopes, magnetometers, temperature sensors, light sensors, and proximity sensors. The number and types of sensor data associated with a digital image may vary depending on the image capture device and the particular implementation.

In the illustrated embodiment, image capture device 106 is connected to data server 104 and computer system 110 via network 102. Image capture device 106 may be configured to transmit images directly to a data server 104 or to computer system 110.

Computer system 110 further comprises outline generating instructions 112. Outline generation instructions 112 comprise one or more instructions which, when executed by computer system 110, cause computer system 110 to analyze a set of digital images and generate an outline of a roof of a building depicted in the set of digital images.

Roof Outline Overview

Figure 2:
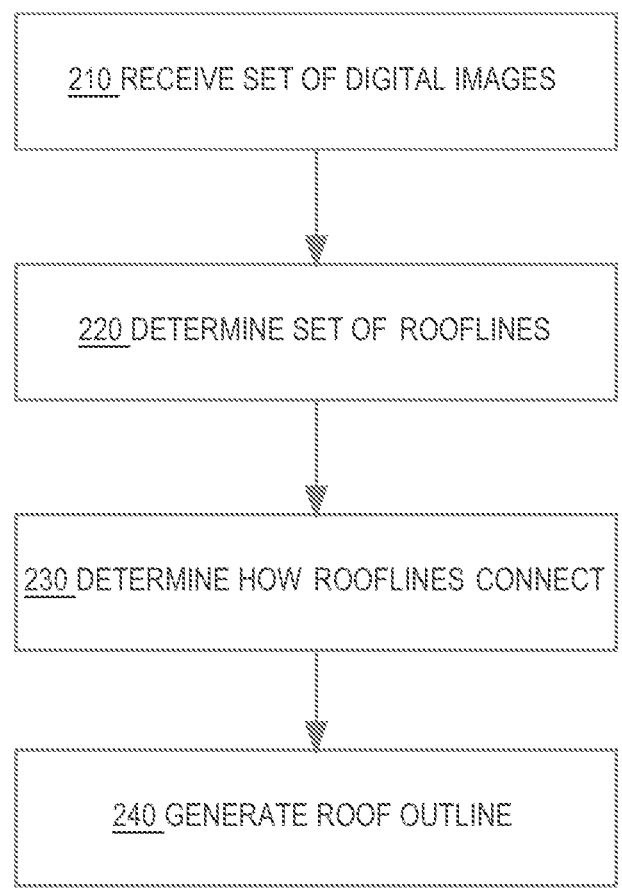
FIG. 2 illustrates an example process for generating a roof outline from a set of lateral images.

FIG. 2 illustrates an example flowchart for generating a roof outline based on a set of lateral images. A roof outline is the shape the roof of a building would have if viewed from an overhead, top-down view.

In an embodiment, the digital data comprises data defining a closed polygon that has the shape of the roof outline. The data may be any type of data that indicates a shape or an image depicting a shape, such as raster, vector, or geometric data. For example, the digital data may be an image depicting the roof outline. As another example, the digital data may define a plurality of ordered points and/or lines that, when rendered using a rendering application, depict the shape of the roof outline.

In an embodiment, the digital data comprises data indicating a scale of the roof outline. The data indicating the scale may be stored in association with the data defining the shape of the roof outline. The scale indicates how the roof outline corresponds to a real-world measurement of the roof outline. For example, the scale may be the real-world measurement for a particular side or segment of the roof outline. As another example, the shape may be defined as an image and the scale may indicate that each pixel corresponds to a particular metric distance.

Figure 3:
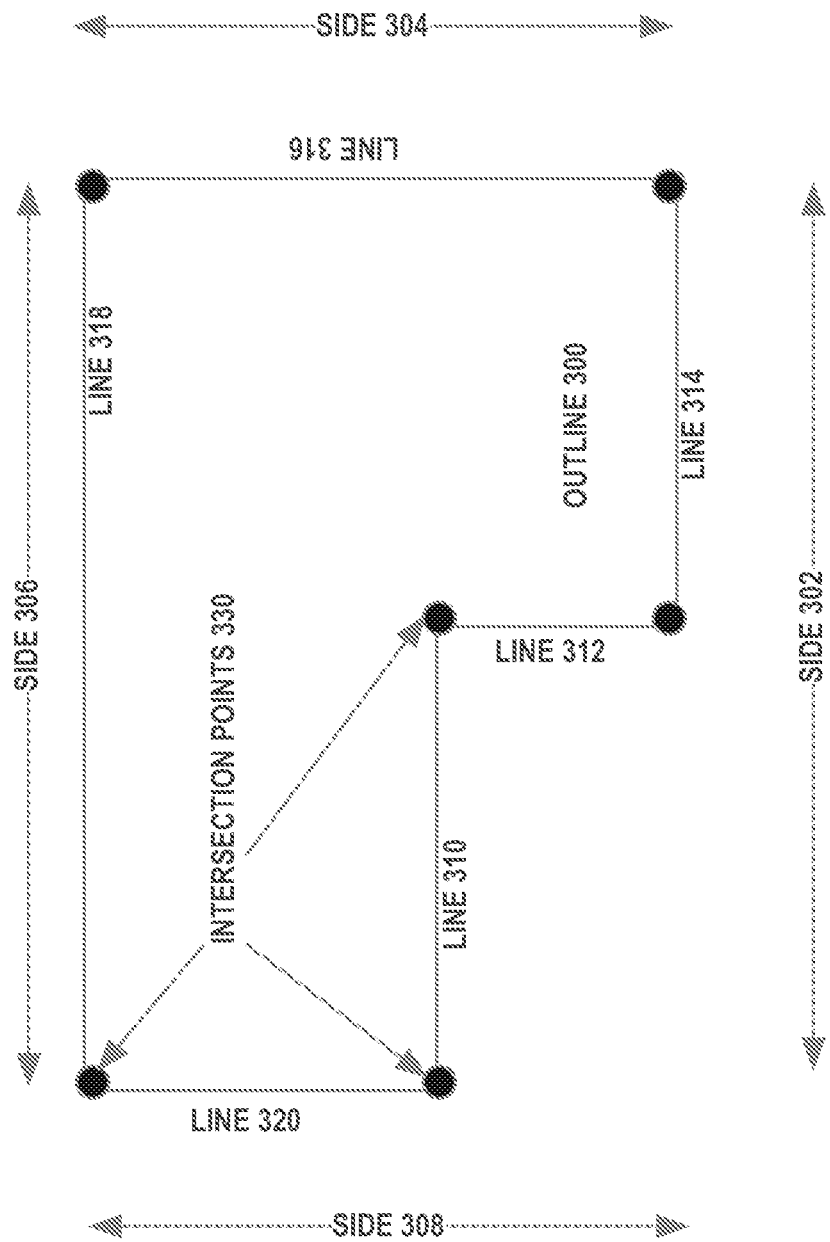
FIG. 3 illustrates an example roof outline.

FIG. 3 illustrates an example top-down view of a building. Outline 300 indicates the shape of the roof outline of the building. The building comprises four sides, side 302, side 304, side 306, and side 308. Outline 300 comprises line 310, line 312, line 314, line 316, line 318, and line 320. Each line connects to another line at an intersection point, such as intersection points 330.

Digital Image Sets

At step 210, a computer system receives a set of digital images or photos. The digital images may be received or retrieved from a single source or a plurality of sources. For example, computer system 110 may receive or retrieve digital images from one or more of data server 104, image capture device 106, or database 120.

The roof outline is generated based on a set of digital images. In an embodiment, the set of digital images comprise a plurality of lateral images. The set of digital images depict a particular building, and each digital image of the image set may depict a different view of the particular building. Additionally, each digital image may be taken at a different height. For example, a hand-held camera or a camera mounted on a stick or drone may be positioned at various heights to avoid visual obstructions.

A digital image may capture a front-facing view or a corner view. A front-facing view depicts a single side of the building, such as the front, back, left or right of the building. A corner view depicts two or more sides of the building, such as the back left or the back right of the building.

In an embodiment, the set of digital images includes at least one digital image for each side of the particular building. For example, referring to FIG. 3, the set of digital images includes at least an image that depicts side 302, an image that depicts side 304, an image that depicts side 306, and an image that depicts side 308.

In an embodiment, the set of digital images comprises at least one digital image for each corner of the particular building. For example, referring to FIG. 3, the set of digital images includes at least an image that depicts sides 302 and 304, an image that depicts sides 304 and 306, an image that depicts sides 306 and 308, and an image that depicts sides 308 and 302.

In an embodiment, the set of digital images comprises at least one digital image for each side of the particular building and at least one digital image for each corner of the particular building. Although examples are described herein with reference to a building that has four sides, the techniques described herein are not limited to any number of sides. The number and types of digital images in an image set may vary depending on the particular building and/or the particular embodiment.

Each digital image may also include metadata associated with the digital image. The metadata may be stored with the digital image or provided to the machine learning model in association with the digital image. The metadata indicates information related to the digital image or to objects depicted in the image. For example, metadata may indicate the location where the digital image was captured. As another example, a user or other data source may provide information related to the building depicted in the digital image, such as whether particular elements are present in the digital image, dimensions of particular elements of the building, the location of walls or roofs in the building, intersection points or end points of roofs or walls of the building, and etc. The information may be stored as metadata associated with the image.

In an embodiment, metadata associated with a digital image includes sensor data from the image capture device that captured the digital image. As described above, example sensors include, but are not limited to, global positioning system (GPS), accelerometers, altimeters, gyroscopes, magnetometers, temperature sensors, light sensors, and proximity sensors. Sensor data may include, for example, azimuth, gravity, linear velocity, angular velocity, distance to an object, and etc.

In an embodiment, metadata associated with a digital image includes view information. The view information may indicate the side or sides of the building depicted in the image. For example, view information for a digital image may indicate that the digital image depicts the front of a building.

In an embodiment, metadata associated with a digital image includes sequence information. The sequence information indicates a sequence of the digital image within the set of digital images. For example, an image corresponding to the front of the building may be sequence number 0, an image corresponding to the front-right of the building may be sequence number 1, an image corresponding to the right of the building may be sequence number 2, and etc.

Determine Rooflines

At step 220, a set of rooflines are determined from the set of digital images. One or more rooflines may be determined from the view of the building depicted in a particular digital image of the set of digital images. Each roofline corresponds to a particular line in the roof outline. In other words, the roof outline may be formed by projecting a plurality of rooflines onto a 2-dimensional plane and connecting them.

The number of rooflines determined for a digital image is based on the particular view depicted in the digital image and the shape of the building. For example, a corner view may have two rooflines, one for each side of the building. If the building is a concave or convex shape, such as a T-shape or a U-shape, then a front-facing view may have a roofline for the concave and/or convex portions.

FIG. 4 illustrates an example digital image 400 and 410. For the purpose of illustrating a clear example, assume image 400 depicts side 302 and image 410 depicts sides 302 and 304. Digital image 400 includes rooflines 402 and 404. Digital image 410 includes rooflines 404 and 406. Rooflines 402, 404, and 406, when projected onto a 2-dimensional plane, correspond to lines 310, 314, and 316 in outline 300, respectively. Additionally, digital image 400 and digital image 410 depict a plurality of gable lines 420. The gable lines 420 may be used to determine a slope of the roof and indicate how rooflines connect to each other.

In an embodiment, determining the one or more rooflines is based on determining one or more lines that are parallel to the roof or the ground depicted in the digital image. For example, a roofline may follow the edge of a roof, a wall of the building, lines on a façade of the building, or the base of the building. For example, referring to image 400, if the right side of the roof is obscured by a tree then roofline 404 may be determined by following the wall of the building rather than by following the roof.

In an embodiment, a roofline may comprise a plurality of segments. Each segment may be determined based on a different part of the building. Referring to the above example, a first portion of roofline 404 may be determined by following the wall of the building, and a second portion may be determined by following the roof. Thus, a roofline may be determined regardless of whether a portion of the roof is obscured. Additionally, any line parallel to the roof may be used to determine the rooflines. Building elements that may be used to determine a roofline or a portion of a roofline may include, for example, gables, chimneys, gutters, downspouts, and etc.

Additionally or alternatively, two or more digital images may depict the same portion of the roof from different angles. A combination of the two or more digital images may be used to determine the roofline corresponding to the portion of the roof.

FIG. 5 illustrates an example digital image 500 and 510. Digital image 500 and digital image 510 depict the same side of a building. In the illustrated example, a part of the building is obscured when captured from a first angle and height, in image 500. Rooflines 502 are obscured by tree 520.

Image 510 is captured at a second angle and height that avoids the obstruction from tree 520. The rooflines 502 are not obscured by tree 520 and are visible in image 510. One or more lines in the roof outline corresponding to the particular part of the building may be determined by correlating image 500 and image 510.

In an embodiment, a machine learning model is trained to identify the one or more rooflines in an image. In other embodiments, the one or more rooflines may be identified based on user input or from metadata indicating the locations of the one or more rooflines within the image.

In an embodiment, rather than identifying one or more rooflines, two or more intersection points are identified. As described above, each roofline connects to another roofline at an intersection point. A roof outline may be formed by projecting the intersection points and connecting the intersection points with lines.

In an embodiment, a machine learning model is trained to identify the two or more intersection points. In other embodiments, the intersection points may be identified based on user input or from metadata indicating the location of the intersection points within the image.

Determining How Rooflines Connect

At step 230, the computer system determines how rooflines in the set of rooflines connect to each other. In an embodiment, to determine how rooflines in the set of rooflines connect, the position of each image is determined. Determining an image comprises determining the position of the image capture device that captured the image. The position of the image capture device includes the location of the device and the rotation of the device. In an embodiment, the position of the image capture device is its position relative to the particular building depicted in the image. In other embodiments, the position of the image capture device is relative to the location of one or more other image capture devices that captured one or more other images in the digital image set. The image capture device and the one or more other image capture devices may be the same device, or may be different image capture devices.

Additionally or alternatively, a combination of two or more images captured at different angles and/or different heights are used to identify related rooflines. Additionally, the same roofline depicted at different angles or heights may also be determined.

In an embodiment, based on image sequence, image location, camera tilt, and relative altitude, a path corresponding to the path of the image capture device around the structure when capturing images in the digital image set is mapped. Based on the path, two or more images that are related in either a horizontal direction or a vertical direction may be determined.

Determining Image Location

In an embodiment, the location of an image capture device is determined based on, at least in part, sensor data from the image capture device. The sensor data may include, for example, GPS location, azimuth, gravity, linear velocity, angular velocity, and distance to an object.

For example, the location of an image capture device may be determined based on a GPS location of the image capture device. The GPS location indicates a longitude and latitude coordinate location. The GPS location may be used to calculate the location of the image capture device relative to the building. Additionally, the GPS location may be used to calculate the location of the image capture device relative to another image capture device. The relative location may include a distance to the other image capture device.

As another example, the position of an image capture device may be determined based on a linear velocity of the image capture device. The linear velocity indicates a speed at which the image capture device is travelling. Assume two digital images are captured in sequence, one after the other. The distance between two image capture devices may be calculated based on the linear velocity of the first image capture device, and the time between when the digital image was captured and when the next digital image in a sequence was captured.

The techniques described herein are not limited to any type or number of sensors and sensor data. Any sensor data from which a distance or a relative distance can be calculated may be used.

Determining Image Rotation

In an embodiment, the rotation of an image capture device is determined based on, at least in part, sensor data from the image capture device. The sensor data may include, for example, GPS location, azimuth, gravity, linear velocity, angular velocity, and distance to an object.

For example, the rotation of an image capture device may be determined based on the azimuth of the image capture device. Azimuth indicates which direction the image capture device was facing, relative to north, when the digital image was captured. Based on the location of the image capture device and azimuth, the direction the image capture device is facing relative to the building may be determined. The azimuth may be compared to azimuth information for another image capture device to determine the rotation of the image capture device relative to the other image capture device.

In an embodiment, the position of an image capture device relative to another image capture device is determined based, in part, on analyzing the contents of the digital image. For each pair of digital images, one or more common building elements depicted in both digital images are identified. For example, one or more common points, lines, or features in a pair of digital images are identified. The relative positions of the common building elements are determined based on the location and appearance of the common points, lines, or features. For example, referring to FIG. 4, digital image 400 and digital image 410 depict the same corner of a building from two different angles. As another example, referring to FIG. 5, digital image 500 and digital image 510 depict the same feature(s) of the building from two different heights.

In an embodiment, a machine learning model is trained to identify common building elements between pairs of digital images. In other embodiments, the common building elements may be identified based on user input or from metadata indicating the location of the elements within the image and metadata indicating the corresponding elements.

In an embodiment, the position of an image capture device relative to another image capture device is determined based on a combination of sensor data and image analysis. For example, a gravity vector is a direction within a three-dimensional plane that indicates where the horizon (ground) is within the digital image. Assume a corner view depicts two sides of the building. A roofline corresponding to at least one of the depicted sides is determined. The relative rotation of the camera with respect to the house along a first axis is calculated based on an intersection of the roofline with the horizon. After calculating the relative rotation with respect to the house for two images, the relative rotation with respect to the two images can be calculated.

The techniques described herein are not limited to any type or number of sensors and sensor data. Any sensor data from which a rotation or a relative rotation can be calculated may be used.

Example Relative Position Calculation

Figure 6:
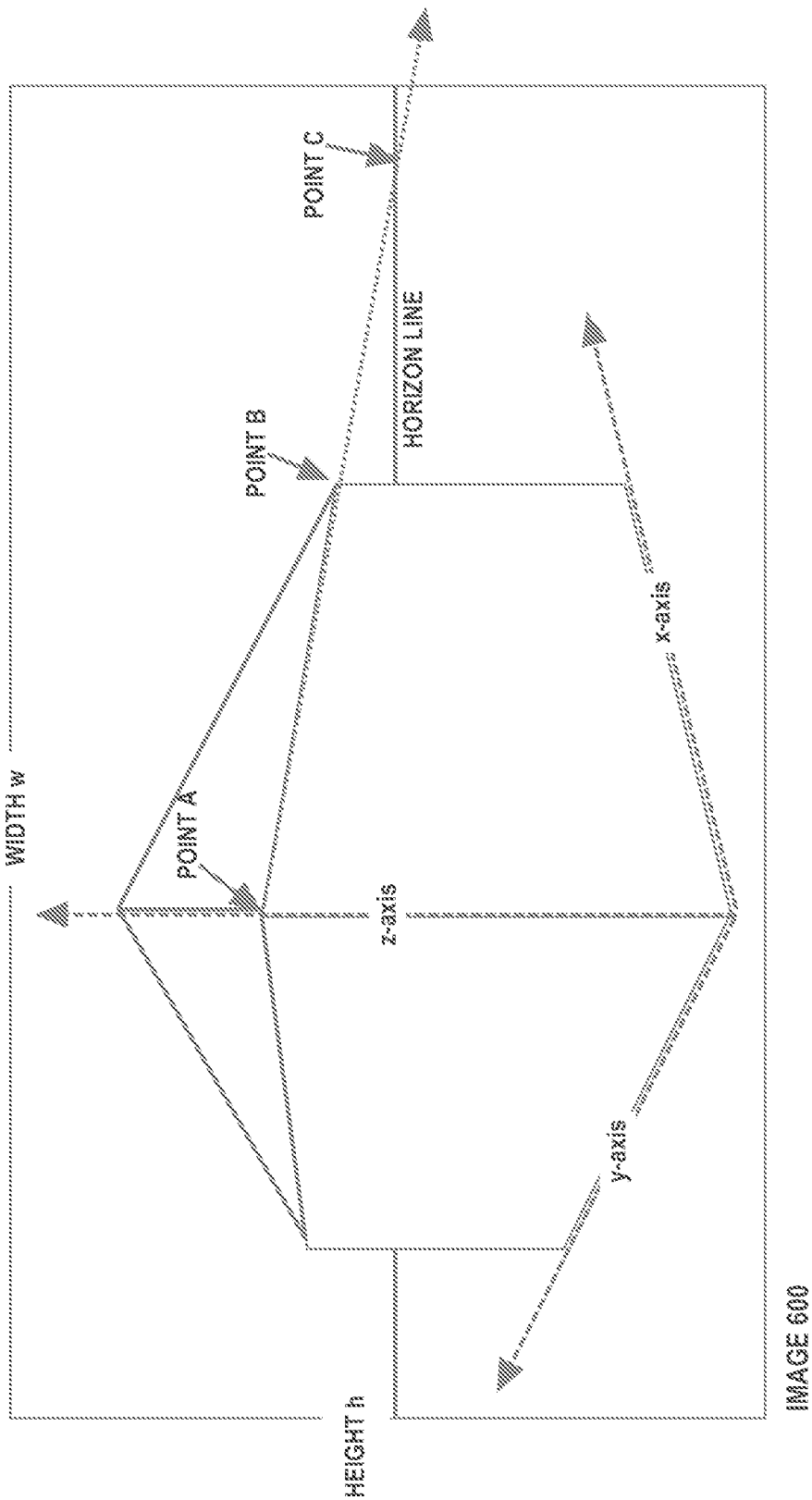
FIG. 6 illustrates an example image depicting a particular view of a building.

FIG. 6 illustrates an example digital image depicting a particular view of a building. Digital image 600 has a height h and a width w. Digital image 600 depicts a particular view, or reference frame, of the building. For the purpose of illustrating a clear example, assume the building lies along a grid. As illustrated in FIG. 6, the base of the building is parallel to the x-axis and the y-axis, and the height of the building is along the z-axis. Points A and B are end points of a roofline that is parallel to the ground. A horizon line indicates the edge of the horizon as depicted in the particular view. Point C is the intersection of a line passing through points A and B and the horizon line.

A gravity vector may be represented as $g=(g_x, g_y, g_z)^T$. An example equation for the horizon line is:

$$g_x \cdot (x-w/2) + g_y \cdot (y-h/2) + g_z \cdot f = 0$$

An example equation for calculating the rotation R of the camera with respect to the reference frame attached to the building is:

$$R = [\, V_x' \quad g \times V_x' \quad g \,]$$

$$V_x = (x_c - w/2, \, y_c - h/2, \, f)^T$$

-continued $$V'_x = \frac{V_x}{\|V_x\|}$$

where f is the focal length of the image, w is the width of the image, h is the height of the image, and g is the gravity vector.

In an embodiment, to compute the relative position, the location of point A may be placed at the origin, (0, 0, 0), and the location of point B at w units away along the x direction. Given $X_A$ and $X_B$ are the projection of points A and B, a translation vector $(t_x, t_y, t_z)^T$ may be calculated by:

$$t_x = x'_a \cdot t_z$$
$$t_y = y'_a \cdot t_z$$
$$t_z = \left(\frac{r_{00} - x'_b \cdot r_{20}}{x'_b - x'_a}\right) \cdot w$$

wherein $r_{00}$ is the 0,0 element of the rotation R matrix, $r_{20}$ is the 2,0 element of the rotation R matrix, and:

$$x'_a = \left(\frac{x_a - \frac{w}{2}}{f}\right)$$

$$x'_b = \left(\frac{x_b - \frac{w}{2}}{f}\right)$$

$$y'_a = \left(\frac{y_a - \frac{h}{2}}{f}\right)$$

$$y' = \left(\frac{y_b - \frac{h}{2}}{f}\right)$$

In an embodiment, a first rotation matrix $R_1$ and a first translation vector $T_1$ may be calculated for a first image, and a second rotation matrix $R_2$ and a second translation vector $T_2$ may be calculated for a second image. An example equation for calculating the relative position of the first and second image is:

$$R_{21} = R_2 \cdot R_1^T$$

$$T_{21} = T_2 - R_2 R_1^T T_1$$

Generating Roof Outline

At step 240, based on the position of each image, the rooflines depicted in the images are connected to generate a roof outline. In an embodiment, each roofline is depicted in two or more images of the digital image set. The positions of the two or more images are triangulated to determine where the roofline is located within a two-dimensional plane.

One or more rooflines or portions of a roofline may be missing in the roof outline. For example, the set of digital images may not include an image that depicts a particular part of the building, or a part of the building is obscured by other objects depicted in the image. In an embodiment, one or more lines in the roof outline are extended or added to fill in the missing portions in order to form a closed polygon.

Additionally or alternatively, two or more digital images may depict a particular part of the building from different angles or heights. For example, a part of the building may be obscured when captured from a first angle or height, but visible from a second angle or height. One or more lines in the roof outline corresponding to the particular part of the building may be determined by correlating the two or more digital images.

In an embodiment, generating the roof outline includes scaling the set of rooflines. Each digital image in the set of digital image may be captured at a different distance from the building. A roofline depicted in a first digital image may be the same pixel distance as a roofline depicted in a second digital image. However, the real-world measurement corresponding to each roofline may be different. That is, one roofline may actually be longer than the other roofline. The length of the scaled rooflines more reflects their real-world sizes relative to each other. Scaling a roofline may comprise stretching or shrinking the roofline.

In an embodiment, scaling one or more rooflines comprises identifying a building feature depicted in an image. The building feature may be a feature with a known size or a common size. Example building features include, but are not limited to, doors, windows, and façade elements like bricks. The length of a roofline in the image is estimated based on the identified building feature. The size may be based on the estimated size of the building feature, or the building feature may be used as a unit of measurement. For example, a roofline may be ten doors long. Based on the identified building feature and the relative position of the remaining images, the lengths of the remaining rooflines in the set of rooflines may be estimated.

Various approaches for determining a scale of a building based on building features are described in U.S. Pat. No. 9,478,031, issued Oct. 25, 2016, the entire contents of which is hereby incorporated by reference as if fully set forth herein.

Image Sequence

In an embodiment, each image in the set of digital images is associated with a sequence number. One or more of steps 220, 230, and 240 may be performed for images in a sequence rather than for all digital images at each step. For example, for a set comprising eight digital images, steps 220, 230, and 240 may be performed for the first and second digital images in the set, then for the second and third, and so on. A portion of the roof outline is generated based on the first and second digital images, and subsequent lines are added to the roof outline based on the subsequent images in the set.

In an embodiment, the sequence number for an image is determined based on metadata associated with the image. For example, if the set of images were taken in a particular order, then the sequence number of the image may be based on the timestamp of the images. As another example, a user or application may indicate a sequence number for each image. The sequence number may be stored in metadata with the image.

In an embodiment, the sequence number for an image is generated based on the image position. For example, the relative position of each image in the set of digital image may be determined. A particular image may be selected to be the first image. The next images in the sequence may be the next images clockwise (or counter-clockwise) from the particular image.

In an embodiment, images are selected based on both horizontal as well as vertical direction. For example, some images may have image positions near the same location but at different angles or heights. Images from near the same location may be related based on their sensor information. In an embodiment, based on sensor data from the plurality of images, a path of an image capture device around the building is determined. A sequence number for an image of the plurality of images may be generated based on the position of the image along the path.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a set of lateral photos of a structure, wherein none of the set of lateral photos depict a whole roof of the structure;
   determining a set of rooflines depicted in the set of lateral photos;
   wherein determining the set of rooflines includes determining, for each photo of the set of lateral photos, one or more lines that are parallel to the roof of the structure;
   determining how rooflines in the set of rooflines connect with each other; and
   based on how rooflines in the set of rooflines connect with each other, generating an image of a closed polygon that has a shape that estimates the shape the whole roof would have if depicted in a top-down view of the structure.

2. The method of claim 1 wherein determining how rooflines connect with each other comprises determining, for each pair of photos of the set of lateral photos, a relative distance corresponding to the pair of photos.

3. The method of claim 1 wherein determining how rooflines connect with each other comprises determining, for each pair of photos of the set of lateral photos, a relative rotation corresponding to the pair of photos.

4. The method of claim 1 wherein determining how rooflines connect with each other is based in part on sensor data associated with each photo in the set of lateral photos.

5. The method of claim 4 wherein the sensor data includes one or more of: azimuth, gravity vector, linear velocity, angular velocity, GPS location, rotation vector, tilt angle, and object distance.

6. The method of claim 1 wherein determining the set of rooflines comprises determining, for each photo of the set of lateral photos, a set of intersection points.

7. The method of claim 1 wherein determining the one or more lines that are parallel to the roof of the structure is based on a roof depicted in the photo.

8. The method of claim 1 wherein determining the one or more lines that are parallel to the roof of the structure is based on a wall depicted in the photo.

9. The method of claim 1 wherein determining the one or more lines that are parallel to the roof of the structure comprises, for at least one photo in the set of lateral photos:
   determining a first line based on a roof depicted in the photo;
   determining a second line based on a wall depicted in the photo;
   combining the first line and the second line.

10. The method of claim 1 wherein determining the one or more lines that are parallel to the roof of the structure comprises, for at least one photo in the set of lateral photos, determining the one or more lines based on one or more building elements depicted in the photo.

11. The method of claim 10 wherein the set of lateral photos include a first photo captured at a first angle and a first height and a second photo captured at a second angle and a second height, wherein a portion of the roof depicted in the first photo is obscured, wherein the same portion of the roof is depicted in the second photo and is not obscured, and wherein determining the set of rooflines comprises:
    determining a first line based on the first photo;
    determining a second line corresponding to the obscured portion of the roof based on the second photo;
    combining the first line and the second line.

12. The method of claim 1 further comprising scaling each roofline in the set of rooflines.

13. A system comprising
    one or more processors;
    one or more non-transitory computer-readable media storing instructions which, when executed by the one or more processors, cause performance of:
    receiving a set of lateral photos of a structure, wherein none of the set of lateral photos depict a whole roof of the structure;
    determining a set of rooflines depicted in the set of lateral photos;
    wherein determining the set of rooflines includes determining, for each photo of the set of lateral photos, one or more lines that are parallel to the roof of the structure; determining how rooflines in the set of rooflines connect with each other; and
    based on how rooflines in the set of rooflines connect with each other, generating an image of a closed polygon that has a shape that estimates the shape the whole roof would have if depicted in a top-down view of the structure.

14. The system of claim 13 wherein determining how rooflines connect with each other comprises determining, for each pair of photos of the set of lateral photos, a relative distance corresponding to the pair of photos.

15. The system of claim 13 wherein determining how rooflines connect with each other comprises determining, for each pair of photos of the set of lateral photos, a relative rotation corresponding to the pair of photos.

16. The system of claim 13 wherein determining how rooflines connect with each other is based in part on sensor data associated with each photo in the set of lateral photos.

17. The system of claim 16 wherein the sensor data includes one or more of: azimuth, gravity vector, linear velocity, angular velocity, and object distance.

18. The system of claim 13 wherein determining the set of rooflines comprises determining, for each photo of the set of lateral photos, a set of intersection points.

19. The system of claim 13 wherein determining the one or more lines that are parallel to the roof of the structure is based on a roof depicted in the photo.

20. The system of claim 13 wherein determining the one or more lines that are parallel to the roof of the structure is based on a wall depicted in the photo.

21. The system of claim 13 wherein determining the one or more lines that are parallel to the roof of the structure comprises, for at least one photo in the set of lateral photos:
   determining a first line based on a roof depicted in the photo;
   determining a second line based on a wall depicted in the photo;
   combining the first line and the second line.

22. The system of claim 13 wherein determining the one or more lines that are parallel to the roof of the structure comprises, for at least one photo in the set of lateral photos, determining the one or more lines based on one or more building elements depicted in the photo.

23. The system of claim 22 wherein the set of lateral photos include a first photo captured at a first angle and a first height and a second photo captured at a second angle and a second height, wherein a portion of the roof depicted in the first photo is obscured, wherein the same portion of the roof is depicted in the second photo and is not obscured, and wherein determining the set of rooflines comprises:
   determining a first line based on the first photo;
   determining a second line corresponding to the obscured portion of the roof based on the second photo;
   combining the first line and the second line.

24. The system of claim 13 further comprising instructions which, when executed by the one or more processors, cause scaling each roofline in the set of rooflines.

* * * * *